Patented Mar. 30, 1937

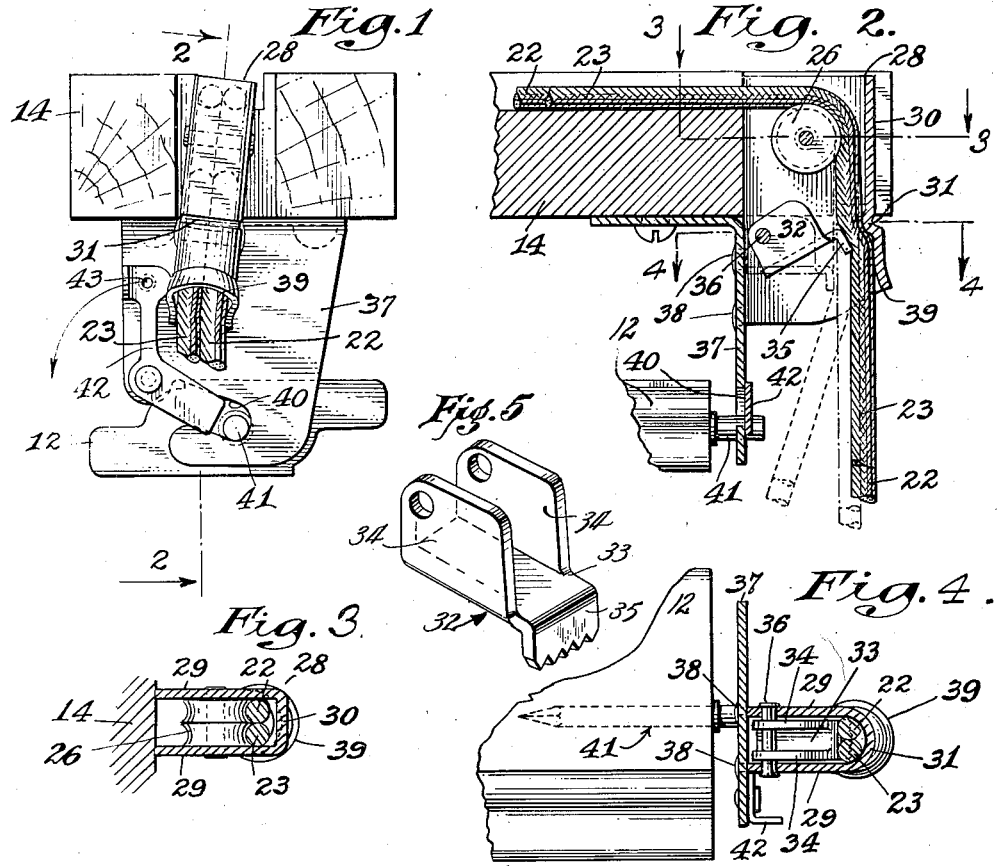

2,075,214

UNITED STATES PATENT OFFICE 2,075,214

VENETIAN BLIND FITTING

Hans K. Lorentzen, Montclair, N. J.

Application April 4, 1935, Serial No. 14,557
Renewed October 28, 1936

10 Claims. (Cl. 156—17)

This invention relates to hardware fittings for use on Venetian blinds.

The general object of the invention is to provide improved fittings formed largely of stamped sheet metal that will be attractive and durable without excessive cost, and which will facilitate operation of such blinds.

A particular object of the invention is to provide a cord lock that can be easily operated by merely swinging the lowering cords to lock the cords in any position of adjustment.

These and other objects and advantages of the invention will become apparent as the description proceeds.

While preferred forms of the invention are disclosed herein for purposes of illustration, it should be understood that various changes may be made in the structure without departing from the spirit and scope of the invention as hereinafter set forth and claimed.

In the drawings,

Fig. 1 is an end elevation of the cord lock and associated Venetian blind parts.

Fig. 2 is a section taken approximately on line 2—2 of Fig. 1;

Fig. 3 is a section taken approximately on line 3—3 of Fig. 1;

Fig. 4 is a section taken approximately on line 4—4 of Fig. 2;

Fig. 5 is an isometric view of the locking dog shown in Figs. 2 and 4.

In the past it has been customary to hold a Venetian blind in any desired position of vertical adjustment by twisting the free ends of the elevating cords around a cleat or knob attached to the window frame. In the present invention these cords can be locked in any position of adjustment by means of the cord lock shown in the drawings.

The main body of the cord lock comprises a U-shaped casing formed with opposite flat sides 29 joined by a back 30. The back is dented inwardly near the lower end of the casing to form a shoulder or detent 31, which has a curved horizontal sectional outline, as is shown in Fig. 4. The pulley 26 is mounted in the upper end of the casing, which is wide enough to accommodate the cords 22 and 23 in side-by-side relation. The locking of the cords is accomplished by the detent 31 in cooperation with a pivoted dog 32. The dog is formed with a bottom plate 33 from the lateral sides of which a pair of ears 34 are bent upwardly, and from one end of which a lip 35 is bent downwardly. A pivot pin 36 passes through the upper ends of the ears 34 at the end of the dog opposite the lip 35, and this pivot pin is mounted in the casing with its center at a point just below the level of the detent 31 and at the opposite end of the casing.

The parts thus described are so arranged that when the mechanism is in the unlocked position, shown in the dot-and-dash lines of Fig. 2, the bottom plate 33 of the dog is maintained in substantially horizontal position by the engagement of one end of the dog with the angle bracket 37 to which the casing is attached. When the parts are in this position the cords 22 and 23 are free to run vertically through the casing, and the blind can be raised or lowered to any position. When the proper position of the blind has been reached and it is desired to lock it in that position, the lower ends of the cords are swung toward the left to the dotted line position of Fig. 2. This action brings the cords into contact with the lip 35 of the dog, which is preferably toothed to increase frictional contact during this action, and the cords are then permitted to move upwardly under the weight of the blind. This upward movement of the cords while in contact with lip 35, moves the dog to the locking position shown in the full lines of Fig. 2. In this position the two cords are clamped between the dog and the detent 31, and any further upward tension on the cord merely serves to wedge the dog more firmly against the detent 31. Due to the curved inner surface of detent 31, the cords can slide about the curved face thereby adjusting themselves for any inequalities of size or shape between the two ropes and insuring equal pressure of the detent on both ropes.

The principle of the gripping action of this cord lock is that the pivoted dog is pressed against the cords by somewhat of a toggle action as its free end is pulled upwardly by the cords. At the same time the cords are bent around under the shoulder so as to obtain a snubbing action. The combination of these actions gives a very secure grip on both ropes without reliance on any biting action that would cut or cause excessive wear of the ropes.

In attaining these results it is not necessary to adhere to the details of the preferred construction illustrated in the drawings. The back of the casing can be given any convenient shape consistent with having a horizontal shoulder so that the ropes can be bent around and partly under the shoulder. And the shoulder should be curved so as to present a concave face to the dog, thereby permitting the ropes to adjust their positions so as to equalize the pressure on them.

The end of the head board 14 is notched to receive the upper end of the lock casing, and the sides 29 of the casing carry lugs which are riveted through openings in angle bracket 37 as shown at 38. The lock casing is mounted on an angle with the lower end of the casing tilted towards the room side of the blind, thus causing the casing to conform to the normal angle of operation of the ropes. The lower end of the casing 10 has its back rounded and it is formed with a flared mouth 39 to avoid running the ropes against any sharp edges.

The casing of the cord lock is supported solely by its attachment to angle bracket 37, thereby providing a compact structure that can be conveniently assembled.

I claim:

1. A Venetian blind fitting comprising a U-shaped casing arranged with its closed side extending substantially vertically, a pulley mounted in the upper end of the casing, the closed side of the casing being dented inwardly to form a shoulder curved in horizontal outline, a locking lever mounted on a pivot located across from the shoulder, said lever including a bottom plate, ears bent upwardly from the sides of the bottom plate, the pivot passing through the ears above one end of the bottom plate, a lip bent downwardly from the end of the bottom plate farthest removed from the pivot, said lip having a flat face presented toward the shoulder, said flat face being normally disposed in a substantially vertical plane when the dog is in unlocked position.

2. A Venetian blind fitting comprising a U-shaped casing arranged with its closed side extending substantially vertically, and having an open top, a pulley mounted in the upper end of the casing and arranged to cooperate with a pair of ropes that extend vertically along the closed side of the casing in side-by-side relation to each other, the closed side of the casing being formed with an inwardly projecting shoulder curved in horizontal outline, and a rope-locking lever mounted on a pivot located across from the shoulder and having a free end extending toward the shoulder, the lever being freely movable in an arc and the free end of the lever being normally biased toward an unlocked position where its free end lies below the shoulder and spaced therefrom a distance greater than the thickness of the ropes, the free end of the lever being swingable by contact of the ropes to be locked to a position below and opposite the shoulder and spaced therefrom a distance less than the normal thickness of the ropes.

3. A Venetian blind fitting comprising a U-shaped casing arranged with its closed side extending substantially vertically, and having an open top, a pulley mounted in the upper end of the casing and arranged to cooperate with a pair of ropes that extend vertically along the closed side of the casing in side-by-side relation to each other, the closed side of the casing being formed with an inwardly projecting shoulder curved in horizontal outline, and a rope-locking lever mounted on a pivot located across from the shoulder and lower than the shoulder on the opposite side of said ropes, the lever having a free end extending toward the shoulder and being freely movable in an arc, the free end of the lever being normally biased toward an unlocked position where its free end lies below the shoulder and spaced therefrom a distance greater than the thickness of the ropes, the free end of the lever being swingable by contact of the ropes to be locked to a position below and opposite the shoulder and spaced therefrom a distance less than the normal thickness of the ropes.

4. A Venetian blind fitting comprising a U-shaped casing arranged with its closed side extending substantially vertically, and having an open top, a pulley mounted in the upper end of the casing and arranged to cooperate with a pair of ropes that extend vertically along the closed side of the casing in side-by-side relation to each other, the closed side of the casing being formed with a shoulder curved in horizontal outline, a lever mounted on a pivot located across from the shoulder, the free end of the lever having a smooth, flat face and being normally biased toward an unlocked position where the flat face lies in a vertical plane spaced from the ropes, the free end of the lever being swingable to a position in which the flat face confronts the shoulder and is spaced therefrom a distance less than the normal thickness of the ropes.

5. A Venetian blind fitting comprising a casing extending substantially vertically and inclosing a pair of ropes, the casing carrying an inwardly projecting surface curved in horizontal outline, and a rope-locking lever mounted on a pivot located across from the curved surface and having a free end extending toward said surface, the lever being freely movable in an arc and the free end of the lever being normally biased toward an unlocked position where its free end lies below the curved surface and spaced therefrom a distance greater than the thickness of the ropes, the free end of the lever being swingable by contact of the ropes to be locked to a position opposite the curved surface and spaced therefrom a distance less than the normal thickness of the ropes.

6. A Venetian blind fitting comprising a U-shaped casing arranged with its closed side extending substantially vertically and adapted to accommodate a pair of ropes in side-by-side relation to each other, the closed side of the casing being formed with an inwardly projecting shoulder curved in horizontal outline, and a rope-locking lever mounted on a pivot located across from the shoulder and having a free end extending toward said shoulder, the lever being freely movable in an arc, and the free end of the lever being normally biased toward an unlocked position where its free end lies below the shoulder and spaced therefrom a distance greater than the thickness of the ropes, the free end of the lever being swingable by contact of the ropes to be locked to a position below and opposite the shoulder and spaced therefrom a distance less than the normal thickness of the ropes.

7. A Venetian blind cord lock comprising: a hollow casing to be affixed adjacent to the supporting bar of the blind with the blind-raising cords extending downwardly through the casing, a rounded stationary shoulder extending across the casing adjacent to one side of the cords, and a pivoted locking dog having a substantially smooth cord-clamping face adjacent to the opposite side of the cords, the dog being biased away from said shoulder to permit free running of the cords between the dog and said shoulder, and the lower edge of said cord-clamping face terminating in a series of downwardly extending teeth, whereby the cords may be swung against the teeth to move the dog toward said shoulder upon slight upward movement of the cords, and thereby effect clamping of the cords between said substantially smooth face of the dog and said shoulder.

8. A Venetian blind cord lock comprising: a hollow sheet metal casing to be affixed adjacent to the supporting bar of the blind with the blind-raising cords extending downwardly through the casing, the casing having a portion dented inwardly to form a rounded shoulder extending across the casing adjacent to one side of the cords, and a pivoted locking dog positioned at a level lower than said shoulder and having a substantially smooth cord-clamping face adjacent to the opposite side of said cords, the dog being biased by gravity away from said shoulder to permit free running of the cords between the dog and said shoulder, and the lower edge of said cord-clamping face terminating in a series of downwardly extending teeth, whereby the cords may be swung against the teeth to elevate the dog upon slight upward movement of the cords, and thereby effect clamping of the cords between said substantially smooth face of the dog and said shoulder.

9. A Venetian blind fitting comprising: a U-shaped sheet metal casing to be affixed adjacent to the supporting bar of the blind with the blind-raising cords extending downwardly through the casing, the casing being dented inwardly to form a shoulder curved in horizontal outline and positioned adjacent to one side of the ropes, a freely movable sheet metal locking dog positioned in the casing on the opposite side of the ropes, the dog having a body portion provided with teeth and having ears bent at right angles to the body portion, and a pivot pin passing through the ears of the dog, the dog being biased into a position permitting free movement of the cords between the dog and said shoulder but being movable by cord contact to clamp the cords between the dog and said shoulder.

10. A Venetian blind fitting comprising: a U-shaped sheet metal casing to be affixed adjacent to the supporting bar of the blind with the blind-raising cords extending downwardly through the casing, a pulley in the upper portion of the casing, the casing being dented inwardly below the pulley to form a shoulder curved in horizontal outline and positioned adjacent to one side of the ropes, a freely movable sheet metal locking dog positioned in the casing on the opposite side of the ropes, the dog having a body portion provided with teeth and having ears bent at right angles to the body portion, and a pivot pin passing through the ears of the dog, the dog being biased into a position permitting free movement of the cords between the dog and said shoulder but being movable by cord contact to clamp the cords between the dog and said shoulder.

HANS K. LORENTZEN.